(12) United States Patent
Hensarling et al.

(10) Patent No.: US 10,767,464 B2
(45) Date of Patent: Sep. 8, 2020

(54) INSULATOR BASE FOR ANTENNA ASSEMBLIES

(71) Applicant: Halliburton Energy Services, Inc., Houston, TX (US)

(72) Inventors: Jesse K. Hensarling, Cleveland, TX (US); Alexei Korovin, Houston, TX (US); Brian Mohon, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/461,770

(22) PCT Filed: Nov. 14, 2017

(86) PCT No.: PCT/US2017/061612
§ 371 (c)(1),
(2) Date: May 16, 2019

(87) PCT Pub. No.: WO2018/118276
PCT Pub. Date: Jun. 28, 2018

(65) Prior Publication Data
US 2019/0361142 A1    Nov. 28, 2019

Related U.S. Application Data

(60) Provisional application No. 62/437,732, filed on Dec. 22, 2016.

(51) Int. Cl.
*E21B 47/017* (2012.01)
*E21B 47/12* (2012.01)
*E21B 49/00* (2006.01)

(52) U.S. Cl.
CPC ............ *E21B 47/017* (2020.05); *E21B 47/12* (2013.01); *E21B 49/003* (2013.01)

(58) Field of Classification Search
CPC ....... E21B 47/017; E21B 47/12; E21B 49/003
See application file for complete search history.

(56) References Cited

U.S. PATENT DOCUMENTS 3,377,549 A * 4/1968 Newman ............... E21B 47/017
324/342
5,939,885 A * 8/1999 McClure .................. G01V 3/30
324/338

(Continued)

FOREIGN PATENT DOCUMENTS

WO    2016114783    7/2016

OTHER PUBLICATIONS

ISRWO International Search Report and Written Opinion for PCT/US2017/061612 dated Feb. 22, 2018.

(Continued)

*Primary Examiner* — David Carroll
(74) *Attorney, Agent, or Firm* — Jason Sedano; C. Tumey Law Group PLLC

(57) ABSTRACT

Wellbore logging tools can include a coil antenna assembly that prevents breakage of a coil wire during downhole use under elevated pressure. The antenna assembly can include an insulator base used to help insulate the wires so elevated downhole pressures do not result in a short to a tool mandrel. The insulator base provides a recessed path for the in/out portions of the wire so manufacturing fixtures of the antenna assembly will not damage them.

17 Claims, 4 Drawing Sheets

(56) References Cited

U.S. PATENT DOCUMENTS

| | | |
|---|---|---|
| 2004/0183538 A1 | 9/2004 | Hanstein et al. |
| 2004/0263414 A1* | 12/2004 | Chen ........................ G01V 3/28 343/895 |
| 2008/0224707 A1 | 9/2008 | Wisler et al. |
| 2009/0072832 A1 | 3/2009 | He et al. |
| 2011/0074427 A1 | 3/2011 | Wang et al. |
| 2011/0316542 A1* | 12/2011 | Frey ........................ G01V 3/26 324/339 |
| 2013/0249561 A1* | 9/2013 | Knizhnik ................ H01Q 3/26 324/339 |
| 2013/0255966 A1 | 10/2013 | Palaghita et al. |
| 2014/0368198 A1* | 12/2014 | Espinosa ................ E21B 47/13 324/333 |

OTHER PUBLICATIONS

Extended European Search Report for Application No. EP17883131 dated Jun. 11, 2020.

* cited by examiner

US 10,767,464 B2

INSULATOR BASE FOR ANTENNA ASSEMBLIES

CROSS-REFERENCE TO RELATED APPLICATION

This application claims the benefit of U.S. Provisional Application No. 62/437,732, entitled "ZERO EXTRUSION INSULATOR BASE," filed Dec. 22, 2016, the entirety of which is incorporated herein by reference.

TECHNICAL FIELD

The present description relates in general to antenna assemblies, and more particularly to, for example, without limitation, an insulator base for an antenna assembly.

BACKGROUND OF THE DISCLOSURE

During drilling operations for the extraction of hydrocarbons, a variety of monitoring techniques are used to provide or record real-time data from the vicinity of a drill bit. Measurements of the surrounding subterranean formations may be made throughout drilling operations using downhole measurement and logging tools, such as measurement-while-drilling (MWD) and/or logging-while-drilling (LWD) tools, which help characterize the formations and aid in making operational decisions. Wellbore logging tools make measurements that may be used to determine the electrical resistivity (or its inverse, conductivity) of the formations being penetrated, where the electrical resistivity indicates various features of the formations. Those measurements may be taken using one or more antennas coupled to or otherwise associated with the wellbore logging tools.

Some logging tool antennas are formed by positioning a non-magnetic, non-conductive bobbin about an axial section of the logging tool, such as a drill collar, and subsequently wrapping a coil winding about the outer circumference of the bobbin. A protective layer is then often formed about the bobbin to secure the bobbin and the coil winding to the drill collar and protect the internal components of the antenna from potentially harmful downhole environments.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present disclosure relates generally to wellbore logging tools used in the oil and gas industry and, more particularly, to the design of coil antenna assemblies to prevent breakage of the coil wire during downhole use under elevated pressure.

Figure 1:
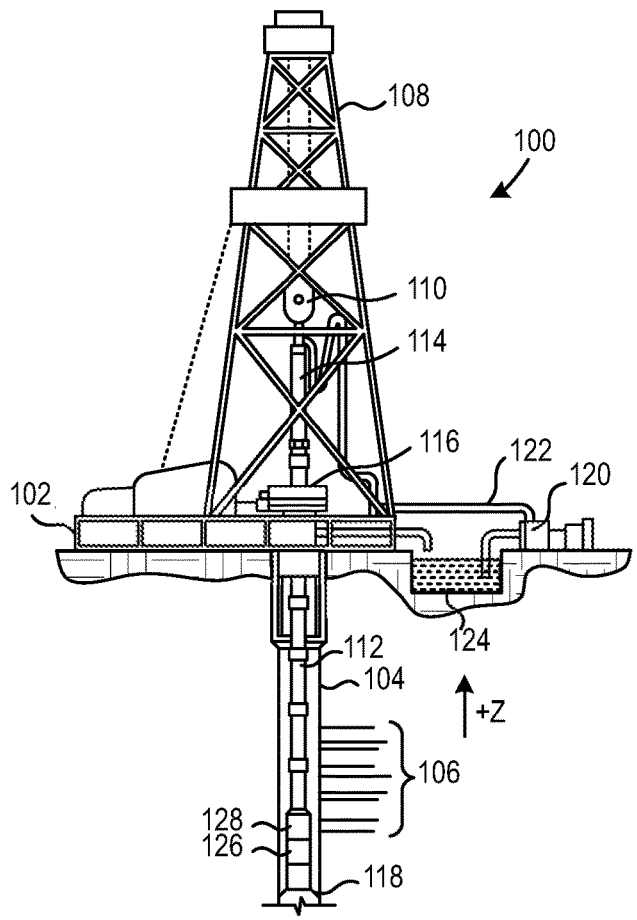
FIG. 1 is a schematic diagram of an exemplary drilling system that may employ the principles of the present disclosure.

FIG. 1 is a schematic diagram of an exemplary drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106. In other embodiments, such as in an offshore drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one wellbore logging tool 126, which may comprise one or more antennas capable of receiving and/or transmitting one or more electromagnetic (EM) signals that are axially spaced along the length of the wellbore logging tool 126.

As the drill bit 118 extends the wellbore 104 through the formations 106, the wellbore logging tool 126 may continuously or intermittently collect azimuthally-sensitive measurements relating to the resistivity of the formations 106, i.e., how strongly the formations 106 opposes a flow of electric current. The wellbore logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the wellbore logging tool 126 may also be stored within the wellbore logging tool 126 or the telemetry module 128 for later retrieval at the surface upon retracting the drill string 112.

Figure 2:
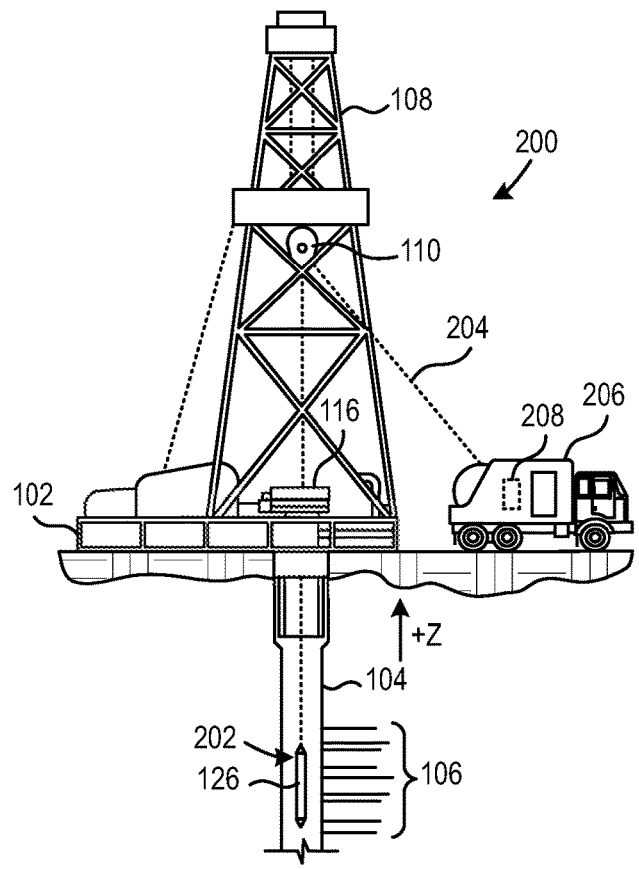
FIG. 2 is a schematic diagram of an exemplary wireline system that may employ the principles of the present disclosure.

At various times during the drilling process, the drill string 112 may be removed from the wellbore 104, as shown in FIG. 2, to conduct measurement/logging operations. More particularly, FIG. 2 depicts a schematic diagram of an exemplary wireline system 200 that may employ the principles of the present disclosure, according to one or more embodiments. Like numerals used in FIGS. 1 and 2 refer to the same components or elements and, therefore, may not be described again in detail. As illustrated, the wireline system 200 may include a wireline instrument sonde 202 that may be suspended into the wellbore 104 by a cable 204. The sonde is the portion of the logging tool that contains the measurement sensors. The wireline instrument sonde 202 and the wellbore logging tool 126 described above, which may be communicably coupled to the cable 204. The cable 204 may include conductors for transporting power to the wireline instrument sonde 202 and also facilitate communication between the surface and the wireline instrument sonde 202. A logging facility 206, shown in FIG. 2 as a truck, may collect measurements from the wellbore logging tool 126, and may include computing and data acquisition systems 208 for controlling, processing, storing, and/or visualizing the measurements gathered by the wellbore logging tool 126. The computing and data acquisition systems 208 may be communicably coupled to the wellbore logging tool 126 by way of the cable 204.

Figure 3A:
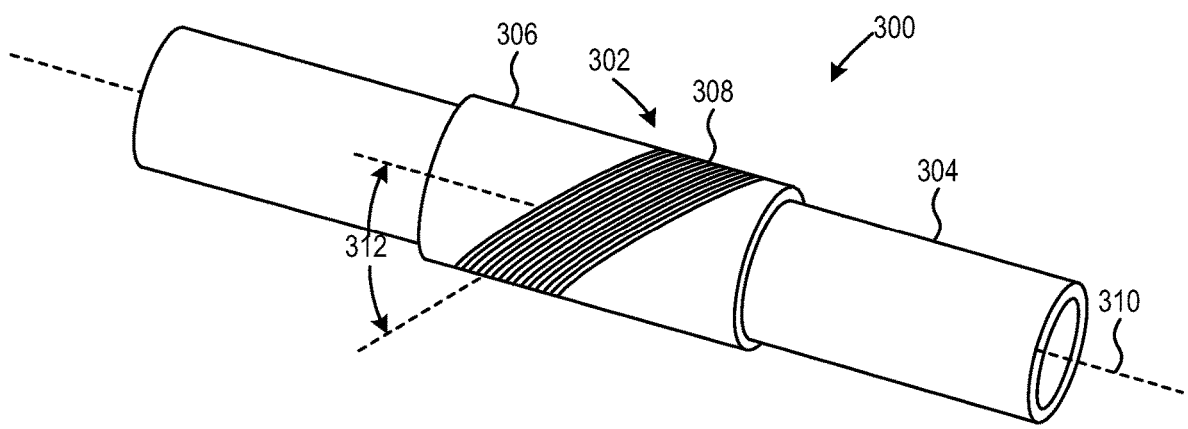
FIG. 3A is a partial isometric view of an exemplary wellbore logging tool.

FIG. 3A is a partial isometric view of an exemplary wellbore logging tool 300, according to one or more embodiments. The logging tool 300 may be the same as or similar to the wellbore logging tool 126 of FIGS. 1 and 2 and, therefore, may be used in the drilling system 100 or the wireline system 200 depicted therein. The wellbore logging tool 300 is depicted as including an antenna assembly 302 that can be positioned about a tool mandrel 304, such as a drill collar or the like. The antenna assembly 302 may include a bobbin 306 and a coil 308 wrapped about the bobbin 306 and extending axially by virtue of winding along at least a portion of an outer surface of the bobbin 306.

The bobbin 306 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The bobbin 306 can be fabricated, for example, by additive manufacturing (i.e., 3D printing), molding, injection molding, machining, or other known manufacturing processes.

The coil 308 can include any number of consecutive "turns" (i.e. windings of the coil 308) of a wire about the bobbin 306, but typically will include at least a plurality (i.e. two or more) consecutive full turns, with each full turn extending 360° about the bobbin 306. In some embodiments, a pathway for receiving the coil 308 may be formed along the outer surface of the bobbin 306. For example, one or more grooves may be defined in the outer surface of the bobbin 306 to receive and seat the coil 308. In other embodiments, however, the outer surface of the bobbin 306 may be smooth or even.

The coil 308 can be concentric or eccentric relative to a central axis 310 of the tool mandrel 304. As illustrated, the turns or windings of the coil 308 extend about the bobbin 306 at a winding angle 312 offset from the central axis 310. As a result, the antenna assembly 302 may be characterized and otherwise referred to as a "tilted coil" or "directional" antenna, and the bobbin 306 may be referred to as a tilted antenna bobbin. In the illustrated embodiment, the winding angle 312 is 45°, by way of example, but could alternatively be any angle offset from the central axis 310 (i.e., horizontal), without departing from the scope of the disclosure.

Figure 3B:
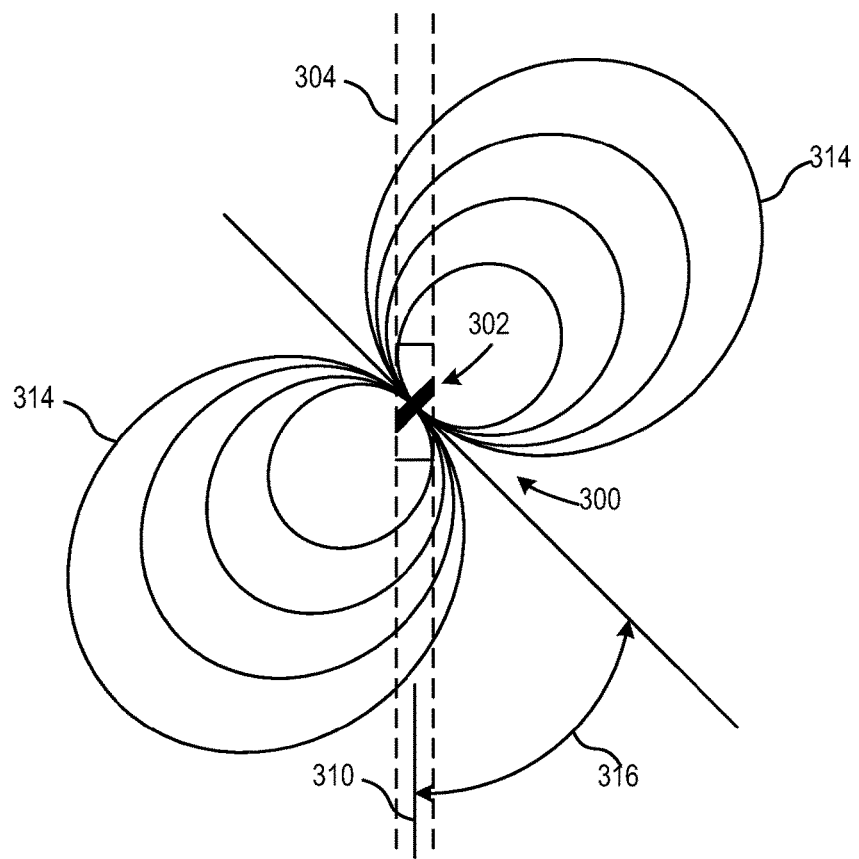
FIG. 3B is a schematic side view of the wellbore logging tool of FIG. 3A.

FIG. 3B is a schematic side view of the wellbore logging tool 300 of FIG. 3A. When current is passed through the coil 308 (FIG. 3A) of the antenna assembly 302, a dipole magnetic field 314 may be generated that extends radially outward from the antenna assembly 302 and orthogonal to the winding direction of the coil 308. As a result, the antenna assembly 302 may exhibit a magnetic field angle 316 with respect to the tool mandrel 304 and, since the winding angle 312 (FIG. 3A) is 45°, the resulting magnetic field angle 316 will also be 45° offset from the central axis 310. As will be appreciated, however, the magnetic field angle 316 may be varied by adjusting or manipulating the winding angle 312.

It should be noted, however, that while the antenna assembly 302 is shown and characterized as a "tilted" coil antenna, the principles of the present disclosure are equally applicable to antenna assemblies having a multi-turn coaxial coil loop antenna, where the coil 308 is generally orthogonal to the central axis 310.

Referring again to FIG. 3A, the wire used to form the coil 308 starts and ends at an electronics module typically provided (arranged) internal to the tool mandrel 304. The electronics module is protected from downhole environments with a pressure barrier, which commonly includes a hermetically sealed connector that facilitates electrical connection between the coil 308 and the electronics module. The wire extends out of the pressure barrier from the hermetically sealed connector to the bobbin 306 where the wire is wrapped multiple times about the bobbin 306 to form the coil 308, as generally described above. The wire then follows a return path back to the pressure barrier and hermetically sealed connector where it completes a closed loop circuit with the electronics module.

In some antenna designs, a gap is formed between the bobbin 306 and the tool mandrel 304 and the wire is required to span this gap while transitioning from the tool mandrel 304 to the bobbin 306 in its initial path and back to the tool mandrel 304 on its return path. The gap, for example, could be formed through implementation of a keyway used to rotationally and axially position the bobbin 306 on the tool mandrel 304. After the coil 308 is set (wound) about the bobbin 306, the volume of the gap is subsequently filled with an epoxy or another dielectric material. A protective layer is then formed (applied) about the outer circumference of the tool mandrel 304 and the bobbin 306 (including the area of the gap), which operates as a pressure barrier that protects the internal components of the antenna assembly 302 from the ingress of downhole fluids. The material of the protective layer can be any material capable of permitting propagation of signals from the antenna assembly 302 while simultaneously withstanding exposure to common wellbore fluids, such as drilling fluids, contaminants, oil, gas, etc. Moreover, the material of the protective layer may also be capable of withstanding elevated temperatures and pressures common in downhole environments. For example, the protective layer can be formed of a nonconductive and/or nonmetallic material, such as a rubber or elastomeric material, a polymer, or a polymeric material.

During downhole use of the antenna assembly, however, elevated pressures may urge the protective layer into the gap and against the epoxy in the gap. This is particularly possible if the epoxy contains air pockets or bubbles that collapse in elevated pressure environments and thereby create a pressure differential across the protective layer. As the protective layer extrudes into the gap, a corresponding load may be assumed on the wire extending across the gap. In some cases, the load assumed by the wire is sufficient to break the wire, which can cause the wire to short against the underlying metal tool mandrel 304.

According to embodiments of the present disclosure, the antenna assembly 302 may further include an insulator base (not shown) used to help insulate the wires so elevated downhole pressures do not result in a short to the tool mandrel 304. As described herein, the insulator base provides a recessed path for the in/out portions of the wire so manufacturing fixtures of the antenna assembly 302 will not damage them.

Figure 4:
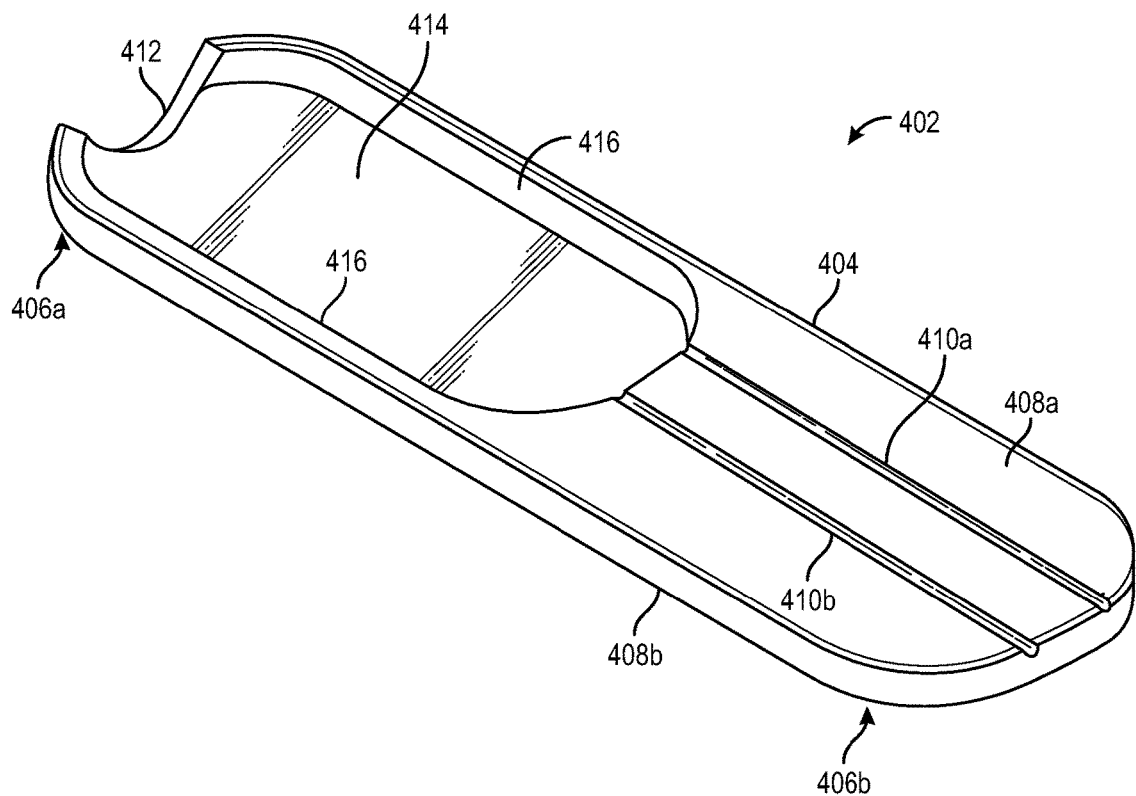
FIG. 4 is an isometric view of an exemplary insulator base.

FIG. 4 is an isometric view of an exemplary insulator base 402, according to one or more embodiments of the present disclosure. As illustrated, the insulator base 402 includes a body 404 having a first end 406a, a second end 406b opposite the first end 406a, an upper surface 408a, and a bottom surface 408b opposite the upper surface 408a. While the body 404 is depicted in FIG. 4 in the general shape of an oval, it will be appreciated that other shapes may be employed, without departing from the scope of the disclosure. The body 404 may be made of any dielectric material including, but not limited to, a high temperature plastic, a thermoplastic, a polymer (e.g., polyimide), a ceramic, an epoxy material, a composite material (e.g., fiberglass), or any combination thereof. Moreover, the insulator base 402 may be fabricated by additive manufacturing (i.e., 3D printing), molding, injection molding, machining, milling, or other known manufacturing processes.

One or more wire channels 410 (two shown as a first wire channel 410a and a second wire channel 410b) may be defined in the body 404 on the upper surface 408a and extend toward the second end 406b. The first wire channel 410a and the second wire channel 410b provide recessed paths to accommodate beginning and end portions of a wire extending to/from an adjacent bobbin (e.g., the bobbin 306 of FIG. 3A). The width of each of the first wire channel 410a and the second wire channel 410b is large enough to receive the wire and deep enough such that the wire rests below the upper surface 408a of the body 404. With the wire positioned below the upper surface 408a, the likelihood of damaging the wire during assembly of the antenna assembly 302 (FIGS. 3A-3B) is reduced or entirely eliminated.

It should be noted that while both the first wire channel 410a and the second wire channel 410b are depicted in FIG. 4, embodiments are contemplated herein where only a single wire channel 410 is employed. In such embodiments, the beginning portion and the end portion of the wire extending to/from the adjacent bobbin would be arranged within the same wire channel 410. Moreover, while the first wire channel 410a and the second wire channel 410b are depicted in FIG. 4 as extending all the way to the second end 406b, embodiments are contemplated herein where the first wire channel 410a and the second wire channel 410b terminate prior to the second end 406b, without departing from the scope of the disclosure.

In some embodiments, the insulator base 402 may include and otherwise provide a recessed lip 412 at the first end 406a of the body 404. The recessed lip 412 may provide a transition location for the beginning portion and the end portion of the wire extending to/from an adjacent pressure barrier (not shown). The recessed lip 412 allows the beginning portion and the end portion of the wire to transition toward to the electronics module of the antenna assembly 302 (FIGS. 3A-3B) without an abrupt (highly deviated) change in direction. The recessed lip also allows for the insertion of a hermetically sealed connector after the insulator base 402 is installed and helps prevent wire chafing as the wire bends to connect to the hermetically sealed connector.

In some embodiments, the insulator base 402 may further include and otherwise provide a service loop region 414. As illustrated, the service loop region 414 may be defined in the upper surface 408a and comprise a recessed portion of the body 404 that extends toward the first end 406a. The service loop region 414 may be used to accommodate excess wire by allowing additional length of the wire to be placed within the confines of the insulator base 402 and built into a radius of the service loop region 414. In some embodiments, for instance, the beginning portion and the end portion of the wire may be initially positioned along the inner walls 416 of the service loop region 414 as extending between the recessed lip 412 and the first wire channel 410a and the second wire channel 410b. This provides "slack" in the wire and otherwise allows excess wire length to be accommodated within the insulator base 402. In the event the beginning or end portions of the wire have to be trimmed during installation or repair servicing, the excess length may be used, which may result in the wire being displaced from the inner walls 416 and moved toward the central portions of the service loop region 414 as the wire straightens.

It is noted that while the service loop region 414 is depicted in FIG. 4 as comprising a singular (solitary) recessed area defined in the insulator base 402, embodiments are contemplated herein where the service loop region 414 comprises a plurality of recessed areas. In such embodiments, the service loop region 414 may comprise corresponding recessed areas to accommodate the beginning portion and the end portion of the wire in curved and straight configurations, without departing from the scope of the disclosure.

Figure 5:
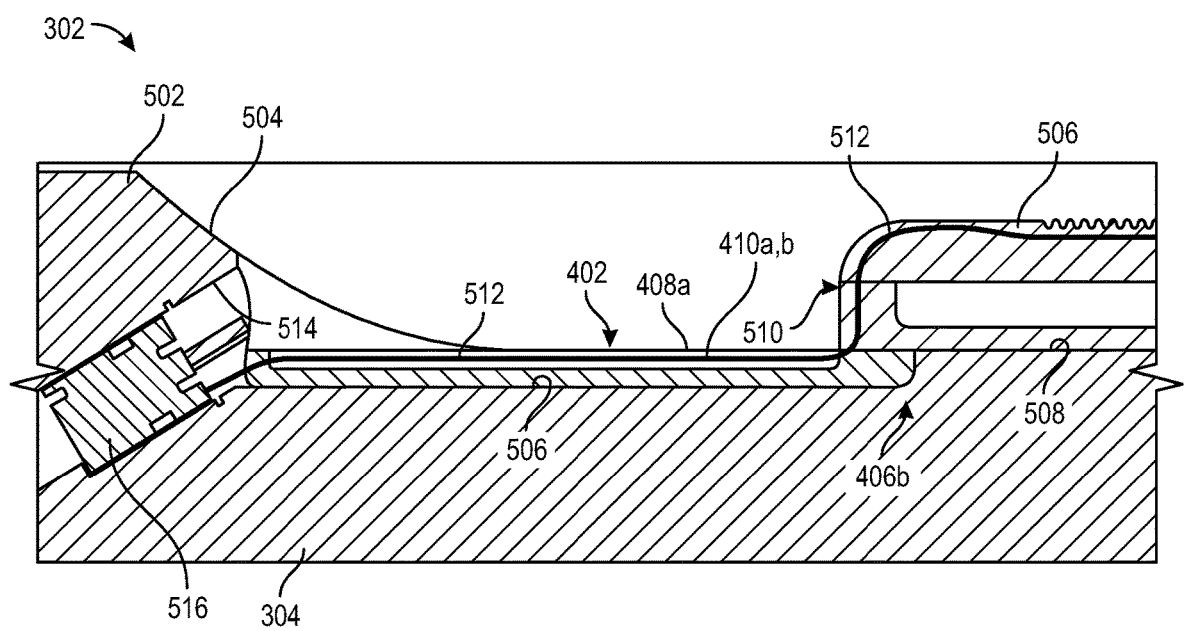
FIG. 5 is a partial cross-sectional side view of the antenna assembly of FIG. 3A including the insulator base of FIG. 4.

FIG. 5 is a partial cross-sectional side view of the antenna assembly 302 of FIG. 3A including the insulator base 402, according to one or more embodiments. In the illustrated embodiment, the tool mandrel 304 provides an outer surface 502 and a saddle 504 is defined in the outer surface 502 and extends along a portion of the axial length of the tool mandrel 304. The saddle 504 generally comprises a reduced-diameter portion of the outer surface 502 as compared to remaining portions of the tool mandrel 304.

In the illustrated embodiment, some or all of the components of the antenna assembly 302 are positioned (arranged) within the saddle 504. As illustrated, the bobbin 306 and the insulator base 402 are located within the saddle 504. The insulator base 402 may be positioned (arranged) within a cavity 506 defined in the outer surface 502 of the tool mandrel 304 and, more specifically, in the outer radial surface 508 of the saddle 504. The cavity 506 may be sized to receive the insulator base 402 and exhibit a depth that allows the upper surface 408a of the insulator base 402 to rest flush with or below the outer radial surface 508 of the saddle 504. The insulator base 402 may be secured within the cavity 506 via a variety of means including, but no limited to, an adhesive, an epoxy, an interference fit, one or more mechanical fasteners, or any combination thereof.

As illustrated, a portion of the second end 406b of the insulator base 402 may radially interpose the tool mandrel 304 and an end 510. Consequently, there is no gap between the bobbin 306 and the tool mandrel 304 that a beginning portion and an end portion of a wire 512 are required to traverse. Rather, the beginning portion and the end portion of wire 512 may transition directly to the bobbin 306 from one of the first wire channel 410a and the second wire channel 410b of the insulator base 402, or transition directly from the bobbin 306 to the first wire channel 410a and the second wire channel 410b without having to traverse a location that may collapse during downhole operation upon assuming elevated downhole pressures. The wire 512 extends from and to a connector port 514, where a hermetically sealed connector 516 is positioned and provides a pressure barrier that protects the electronics module arranged internal to the tool mandrel 304.

Figure 6A:
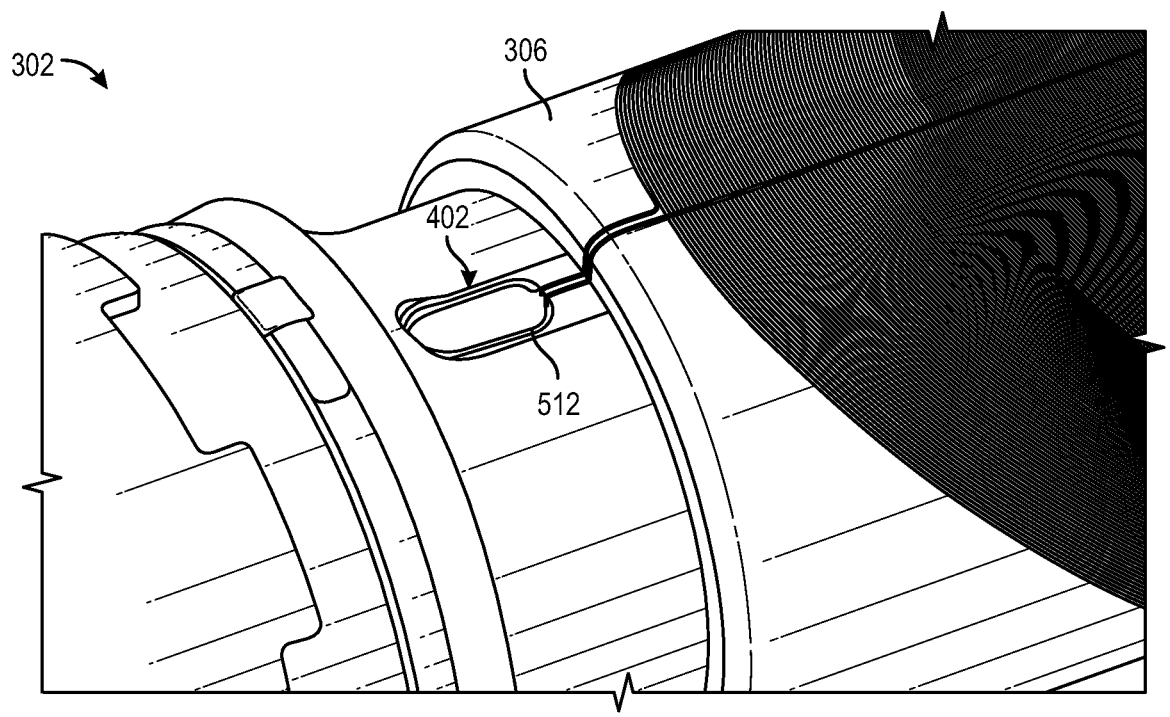
FIGS. 6A and 6B are isometric and top views, respectively, of the antenna assembly of FIG. 3A including the insulator base of FIG. 4.
Figure 6B:
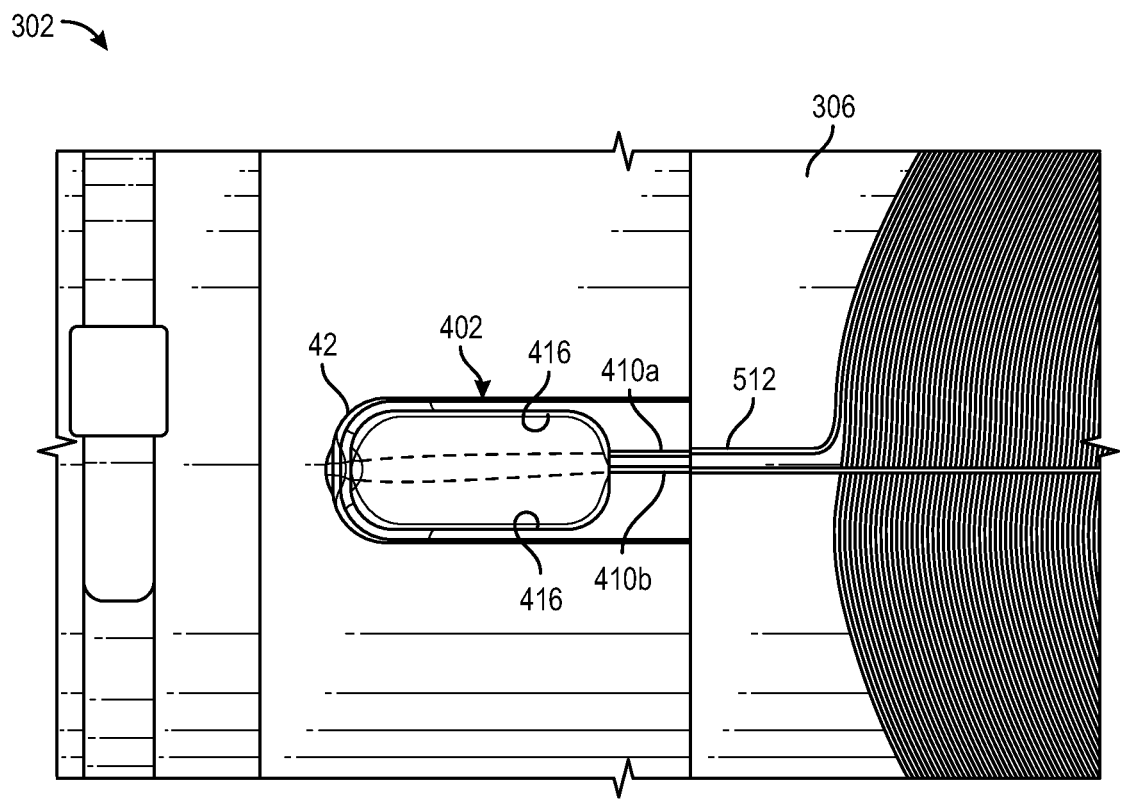

FIGS. 6A and 6B are isometric and top views, respectively, of the antenna assembly 302 including the insulator base 402 of FIG. 4. With reference to FIG. 6B, the wire 512 is shown extending to and from the bobbin 306 and seated within the first wire channel 410a and the second wire channel 410b. The wire 512 also extends through the service loop region 414 and is shown initially positioned along the inner walls 416 of the service loop region 414 as extending between the recessed lip 412 and the first wire channel 410a and the second wire channel 410b. As mentioned above, running the wire 512 along the inner walls 416 provides an amount of "slack" in the wire 512 and thereby allows excess wire length to be accommodated within the insulator base 402. In the event the beginning or end portions of the wire 512 have to be trimmed during installation or repair servicing, the excess length may be used, which may result in the wire 512 being displaced from the inner walls 416 and moved toward the central portions of the service loop region 414 as the wire straightens. The dashed lines show this.

Various examples of aspects of the disclosure are described below as clauses for convenience. These are provided as examples, and do not limit the subject technology.

Clause A. A logging tool comprising: a tool mandrel; a bobbin positioned about the tool mandrel; a coil including windings of a wire wrapped about the bobbin, the wire comprising a beginning portion and an end portion; and an insulator base having an end that radially interposes the tool mandrel and an end of the bobbin, the insulator base defining one or more wire channels that receive the beginning portion and the end portion of the wire.

Clause B. A logging tool comprising: a tool mandrel having a cavity; an insulator base within the cavity and defining one or more wire channels; a bobbin positioned about the tool mandrel and an end of the insulator base; an electronics module positioned within the tool mandrel; a coil including windings of a wire wrapped about the bobbin, wherein a beginning portion and an end portion of the wire extend within the one or more wire channels and to the electronics module.

Clause C. A method comprising: positioning a bobbin about a tool mandrel and an end of an insulator base within a cavity of the tool mandrel; winding a wire about the bobbin; positioning a beginning portion and an end portion of the wire within one or more wire channels of the insulator base; coupling the beginning portion and the end portion to an electronics module within the tool mandrel.

Each of embodiments A, B, and C may have one or more of the following additional elements in any combination:

Element 1: wherein the insulator base comprises a dielectric material selected from the group consisting of a high temperature plastic, a thermoplastic, a polymer, a ceramic, an epoxy material, a composite material, and any combination thereof.

Element 2: wherein the one or more wire channels are defined in an upper surface of the insulator base and exhibit a depth deep enough such that the wire rests below the upper surface when received within the one or more wire channels.

Element 3: wherein the one or more wire channels comprise a first wire channel that receives the beginning portion of the wire, and a second wire channel that receives the end portion of the wire.

Element 4: wherein the insulator base further includes a service loop region.

Element 5: wherein the bobbin is positioned within a saddle defined in the tool mandrel, and wherein the insulator base is positioned within a cavity defined in an outer radial surface of the saddle.

Element 6: wherein a depth of the cavity is sized to receive the insulator base such that an upper surface of the insulator base rests flush with or below the outer radial surface of the saddle.

Element 7: wherein the insulator base is secured within the cavity via at least one of an adhesive, an epoxy, an interference fit, one or more mechanical fasteners, or any combination thereof.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A logging tool, comprising:
   a tool mandrel;
   a bobbin positioned about the tool mandrel;
   a coil including windings of a wire wrapped about the bobbin, the wire comprising a beginning portion and an end portion; and
   an insulator base having an end that radially interposes the tool mandrel and an end of the bobbin, the insulator base defining one or more wire channels in an upper surface of the insulator base that receive the beginning portion and the end portion of the wire, wherein the one or more wire channels exhibit a depth deep enough such that the wire rests below the upper surface when received within the one or more wire channels.

2. The logging tool of claim 1, wherein the insulator base comprises a dielectric material selected from the group consisting of a high temperature plastic, a thermoplastic, a polymer, a ceramic, an epoxy material, a composite material, and any combination thereof.

3. The logging tool of claim 1, wherein the one or more wire channels comprise a first wire channel that receives the beginning portion of the wire, and a second wire channel that receives the end portion of the wire.

4. A logging tool, comprising:
   a tool mandrel;
   a bobbin positioned about the tool mandrel;
   a coil including windings of a wire wrapped about the bobbin, the wire comprising a beginning portion and an end portion; and
   an insulator base having an end that radially interposes the tool mandrel and an end of the bobbin, the insulator base defining one or more wire channels that receive the beginning portion and the end portion of the wire, wherein the insulator base further includes a service loop region.

5. A logging tool, comprising:
   a tool mandrel;
   a bobbin positioned about the tool mandrel;
   a coil including windings of a wire wrapped about the bobbin, the wire comprising a beginning portion and an end portion; and
   an insulator base having an end that radially interposes the tool mandrel and an end of the bobbin, the insulator base defining one or more wire channels that receive the beginning portion and the end portion of the wire, wherein the bobbin is positioned within a saddle defined in the tool mandrel, and wherein the insulator base is positioned within a cavity defined in an outer radial surface of the saddle.

6. The logging tool of claim 5, wherein a depth of the cavity is sized to receive the insulator base such that an upper surface of the insulator base rests flush with or below the outer radial surface of the saddle.

7. The logging tool of claim 5, wherein the insulator base is secured within the cavity via at least one of an adhesive, an epoxy, an interference fit, one or more mechanical fasteners, or any combination thereof.

8. The logging tool of claim 5, wherein the insulator base comprises a dielectric material selected from the group consisting of a high temperature plastic, a thermoplastic, a polymer, a ceramic, an epoxy material, a composite material, and any combination thereof.

9. A logging tool comprising:
a tool mandrel having a cavity;
an insulator base within the cavity and defining one or more wire channels in an upper surface of the insulator base that exhibit a depth deep enough such that a wire rests below the upper surface when received within the one or more wire channels;
a bobbin positioned about the tool mandrel and an end of the insulator base;
an electronics module positioned within the tool mandrel; and
a coil including windings of the wire wrapped about the bobbin, wherein a beginning portion and an end portion of the wire extend within the one or more wire channels and to the electronics module and the one or more wire channels exhibit a depth deep enough such that a wire rests below the upper surface when received within the one or more wire channels.

10. The logging tool of claim 9, wherein the one or more wire channels comprise a first wire channel that receives the beginning portion of the wire, and a second wire channel that receives the end portion of the wire.

11. A logging tool, comprising:
a tool mandrel having a cavity;
an insulator base within the cavity and defining one or more wire channels;
a bobbin positioned about the tool mandrel and an end of the insulator base;
an electronics module positioned within the tool mandrel; and
a coil including windings of a wire wrapped about the bobbin, wherein a beginning portion and an end portion of the wire extend within the one or more wire channels and to the electronics module, wherein the insulator base further includes a service loop region.

12. A logging tool, comprising:
a tool mandrel having a cavity;
an insulator base within the cavity and defining one or more wire channels;
a bobbin positioned about the tool mandrel and an end of the insulator base;
an electronics module positioned within the tool mandrel;
a coil including windings of a wire wrapped about the bobbin, wherein a beginning portion and an end portion of the wire extend within the one or more wire channels and to the electronics module, wherein the bobbin is positioned within a saddle defined in the tool mandrel, and wherein the cavity is defined in an outer radial surface of the saddle.

13. The logging tool of claim 12, wherein a depth of the cavity is sized to receive the insulator base such that an upper surface of the insulator base rests flush with or below the outer radial surface of the saddle.

14. The logging tool of claim 12, wherein the insulator base is secured within the cavity via at least one of an adhesive, an epoxy, an interference fit, one or more mechanical fasteners, or any combination thereof.

15. A method, comprising:
positioning a bobbin about a tool mandrel and an end of an insulator base within a cavity of the tool mandrel;
winding a wire about the bobbin;
positioning a beginning portion and an end portion of the wire within one or more wire channels of the insulator base, wherein the one or more wire channels are defined in an upper surface of the insulator base and exhibit a depth deep enough such that the wire rests below the upper surface when received within the one or more wire channels; and
coupling the beginning portion and the end portion to an electronics module within the tool mandrel.

16. A method, comprising:
positioning a bobbin about a tool mandrel and an end of an insulator base within a cavity of the tool mandrel;
winding a wire about the bobbin;
positioning a beginning portion and an end portion of the wire within one or more wire channels of the insulator base; and
coupling the beginning portion and the end portion to an electronics module within the tool mandrel;
wherein the bobbin is positioned within a saddle defined in the tool mandrel, and
wherein the cavity is defined in an outer radial surface of the saddle.

17. The method of claim 16, wherein a depth of the cavity is sized to receive the insulator base such that an upper surface of the insulator base rests flush with or below the outer radial surface of the saddle.

* * * * *